United States Patent [19]

Vurlicer

[11] 3,852,085

[45] Dec. 3, 1974

[54] STABLE REFRACTORY SLURRY COMPOSITION

[75] Inventor: Ginter Vurlicer, Beaumont, Tex.

[73] Assignee: E. I. du Pont de Nemours and Company, Wilmington, Del.

[22] Filed: Jan. 9, 1974

[21] Appl. No.: 431,861

[52] U.S. Cl....... 106/193 R, 106/38.23, 106/197 C, 260/29.6 S, 260/17
[51] Int. Cl. .................... C08h 17/02, C08b 27/02
[58] Field of Search ....... 260/17, 29.6 S; 106/38.22, 106/38.23

[56] References Cited
UNITED STATES PATENTS

| | | | |
|---|---|---|---|
| 3,079,303 | 2/1963 | Raff | 424/34 |
| 3,428,464 | 2/1969 | Pollard | 106/38.23 |
| 3,455,705 | 7/1969 | Rusher | 106/38.23 |
| 3,687,846 | 8/1972 | Lang | 252/8.5 A |

Primary Examiner—Theodore Morris

[57] ABSTRACT

A three component suspending agent system consisting of carboxymethyl cellulose, carboxyvinyl polymer, and magnesium montmorillonite clay is useful for suspending refractory grains. A stable, silicious refractory slurry composition useful for coating heat sensitive surfaces is made by mixing water, refractory silica and a binder vehicle concentrate containing colloidal silica sol and the above mentioned novel three component suspending agent system. Low viscosity of said slurry is achieved by (1) using low shear mixing to dissolve the suspending agent in water; (2) adjusting pH of the solution from step 1 to within the range of 5 to 9; (3) using moderate to high shear mixing to render the solution uniform after other desired components of the binder vehicle concentrate have been added, and (4) utilizing low to moderate shear mixing after dilution with water and addition of the refractory silica.

9 Claims, No Drawings

STABLE REFRACTORY SLURRY COMPOSITION

BACKGROUND OF THE INVENTION

This invention relates to a stable, refractory slurry composition having low viscosity and a process for making the same. The stable, low viscosity refractory slurry composition of this invention contains a colloidal silica binder vehicle and refractory silica grain and is useful as a protective coating composition for hot metal surfaces.

It is well known that refractory slurry compositions containing vitreous and/or crystalline silica and colloidal silica binder are useful for protective coating of hot surfaces, such as the metal inner walls of molds used in casting metal ingots and the metal "stools" on which the molds rest during teeming, e.g. U.S. Pats. Nos. 3,184,813 and 3,509,936. These coating compositions also have release properties which alleviate the problem of the cast metal sticking to the molds or stools.

In the past, various suspending agents have been employed to keep the silica particles in relatively stable suspension in the aqueous colloidal sol.

Pollard, U.S. Pat. No. 3,428,464, is directed to the use of xanthomonas hydrophilic colloids as suspending agent for a refractory coating composition containing a refractory in a binder. Possible refractories are vitreous silica, crystalline silica, and water-insoluble metal silicates, such as magnesium silicate, aluminum silicate, zirconium silicate and siliceous clay. Colloidal silica sol is a possible binder.

In Rusher, U.S. Pat. No. 3,455,705 there is described a method of improved suspension wherein magnesium montmorillonite clay, xanthomonas hydrophilic colloids and mixtures thereof are used as suspending agents for a refractory slurry composition which contains fused silica suspended in colloidal silica aquasols.

U.S. Pat. No. 3,428,464, Pollard, at lines 15–25 of column 7 states that carboxymethyl cellulose when used alone as a suspending agent causes an increase in viscosity of the slurry upon standing to the point where solidification occurs as a single phase or in the lower phase when the slurry separates into an upper water component and a lower slurries solid component.

SUMMARY OF THE INVENTION

It has been discovered that carboxymethyl cellulose, carboxyvinyl polymers, and magnesium montmorillonite clays form a suspending agent system for a silicious refractory slurry.

Specifically, it has been found that a stable, refractory slurry composition useful for protective coating of hot metal surfaces can be made from about equal parts by weight of a binder vehicle concentrate as described hereinbelow, water, and refractory silica grain. The binder vehicle concentrate comprises about 0.45–0.55 weight percent of carboxymethyl cellulose and carboxyvinyl polymer taken together with the relative amount of carboxymethyl cellulose to carboxyvinyl polymer varying from a weight percent ratio of about 1:4 to 4:1 and about 0.30–0.80 percent by weight magnesium montmorillonite clay as suspending agents; about 0 to 0.20 weight percent alkali, alkaline earth or ammonium hydroxide; about 20–32 percent by weight colloidal silica as colloidal silica sol; and the remainder being water. Optionally about 6 to 40 weight percent of a polyhydric aliphatic compound may be present.

It has been found that a stable, low viscosity, refractory slurry composition resistant to phase separation, grain sedimentation and viscosity changes and containing the elements given hereinabove can be obtained by the following process steps:

1. Using low shear mixing to dissolve the suspending agents in water;
2. Adding dilute solution of alkali metal, alkaline earth or ammonium hydroxide to adjust the pH to within the range of 5 to 9;
3. Adding the other components of the binder composition;
4. Using moderate to high shear mixing to render the solution uniform;
5. Diluting with water and adding silica grain while using low to moderate shear mixing.

Alternatively, the binder vehicle concentrate obtained by the first four steps may be packaged separately for later dilution and grain addition at the place of use.

The stable refractory slurry composition of this invention is useful as a protective coating for stools and molds employed in the casting of metal ingots.

DESCRIPTION OF THE INVENTION

The suspending agent system employed in this invention consists of three components which are carboxymethyl cellulose, carboxyvinyl polymer, and magnesium montmorillonite clay. Carboxymethyl cellulose by itself can not be used as a suspending agent for silicious refractory slurries since over a period of time it causes thickening of the slurry. Carboxyvinyl polymer if used alone as a suspending agent would precipitate out. It has been found that when these two substances are used together with magnesium montmorillonite clays, stable grain suspension can be achieved and, if desired, at low slurry viscosity.

Carboxymethyl cellulose is a water soluble polymer which is conveniently added in dry powder form to water. For suitable carboxymethyl cellulose material, a 2% solution in water should give a viscosity of about 10,000 to 20,000 centipoise when measured with a Brookfield viscometer at room temperature of about 68°–72°F., cylindrical spindle 4 at 6 r.p.m. Suitable grades of carboxymethyl cellulose are the high viscosity, high "sodium substitution" — around 70% — types, such as "CMC—7H," a product of Hercules Chemical Co.

The carboxyvinyl polymer can also be added in dry powder form to water. suitable carboxyvinyl polymers are available in a molecular weight range of about 250,000 to 4,000,000. A preferred material is "Carbopol 941" which is a product of the B. F. Goodrich Company and has a molecular weight of about 1,000,000.

The amounts of carboxymethyl cellulose and carboxyvinyl polymer used in this invention can vary as long as the total amount of the two components is around about 0.45 to 0.55 percent by weight of the binder vehicle concentrate and the amount of neither component is less than about 0.10 percent by weight of the binder vehicle concentrate. The preferred amount of these two agents is about 0.20 to 0.30 percent each. Based upon the weight of the suspending agent system alone, the total amount of these two components may vary from about 36 to 65 weight percent with the relative amount of carboxymethyl cellulose to carboxyvinyl polymer varying from a weight percent ratio of about 1:4 to 4:1.

The magnesium montmorillonite clays are available commercially. Of the clays the magnesium aluminum silicates having a lath-like structure and commonly known as hectorite-type clays are preferred. A clay suitable for the compositions of the present invention is "Benaqua," a product of National Lead Company. The amount of magnesium montmorillonite clay can vary from 0.30 to 0.80 weight percent with the preferred range being from about 0.40 to 0.60 weight percent of the binder vehicle concentrate. The clay content of the suspending agent system alone is from about 35 to 64 weight percent of the suspending agent system.

Aqueous colloidal silica sols suitable for use in this invention are described in Bechtold and Snyder, U.S. Pat. No. 2,574,903; Rule U.S. Pat. No. 2,577,485; White U.S. Pat. No. 2,285,477; Alexander U.S. Pat. No. 2,750,345; Marshall U.S. Pat. No. 2,515,960; Trial U.S. Pat. No. 2,573,743; Atkins U.S. Pat. No. 3,012,973; Legal U.S. Pat. No. 2,724,701; and Dirnberger, et al., U.S. Pat. No. 2,974,109. It is preferred to use colloidal silica sols made by the process of Dirnberger, et al.

Such aqueous colloidal silica sols contain silica particles which are spherical and which have an average size from about 3 to 150 millimicrons. Preferably, the particle size is from about 5 to 50 millimicrons. The ratio $SiO_2:Na_2O$ can range from about 60:1 up to the upper limits of the above cited patents. Colloidal silica is present in the binder vehicle concentrate in amounts ranging from about 20 to 32 percent by weight based on the binder vehicle concentrate, and preferably from about 20 to 28 percent by weight.

As a stabilizer against freezing damage during storage a polyhydric aliphatic compound is added to the binder vehicle concentrate. The polyhydric aliphatic compound must be soluble in water and compatible with the aqueous colloidal silica sol present. Preferred polyhydric compounds are ethylene glycol, diethylene glycol, triethylene glycol, tetraethylene glycol, propylene glycol and dipropylene glycol. The most preferred polyhydric compound for this invention is ethylene glycol. The polyhydric aliphatic compound is present in a range from about 6 to 40 percent by weight based on the binder vehicle concentrate.

To improve the capability of a coating of the composition of this invention to adhere to metal surfaces, a wetting agent can be added. Nonionic or anionic wetting agents may be employed. The wetting agent is added in amounts ranging from 0 to 0.10 percent by weight. Also, an antifoam agent may be added to avoid permanent bubbles in the coating formed by the composition of this invention when said composition is applied to a hot surface and dries to a film. The amount of antifoam agent which is added may vary from 0 to 0.10 weight percent. A suitable antifoam agent is "AF-60," a product of General Electric (30% active).

Formaldehyde may be added as a bactericide in order to stabilize the binder vehicle concentrate or slurry against growth of microorganism. The amount of formaldehyde included in the compositions of this invention may vary from 0 to 0.06 weight percent (on an absolute basis) based upon the weight of the binder vehicle concentrate.

The refractory silica to be used in the composition of this invention is preferably selected from a group consisting of vitreous silica, crystalline silica and water-insoluble metal silicates, or mixtures thereof. Suitable water-insoluble metal silicates are magnesium silicate, aluminum silicate and zirconium silicate. In the most preferred embodiment of this invention, the refractory silicate is 30–50 percent by weight vitreous silica and 50–70 percent by weight crystalline silica.

Vitreous silicas are glassy modifications of silica, obtained by the fusion of selected low temperature crystalline forms. The fused silica suitable for use in the compositions of this invention has a silica content of not less than 97 percent silica as $SiO_2$ and a thermal coefficient of expansion not greater than about $6 \times 10^{-7}$ cm./cm./°C. In preferred form the compositions contain fused silicas which have the highest $SiO_2$ content with the lowest coefficient of expansion. A typical fused silica has a thermal coefficient of expansion of about $5 \times 10^{-7}$ cm./cm./°C. and the following analysis:

| Components | Percent by Weight |
| --- | --- |
| $SiO_2$ | 97.3 |
| $Al_2O_3$ | 1.7 |
| Suboxides of silica | 0.55 |
| Elemental silicon | 0.45 |
| | 100.00 |

Silica products of this type are readily prepared by hammer-milling and grinding very pure fused silica glasses which are formed by reduction of relatively pure silica sands by graphite electrodes in an electric arc furnace. These vitreous silicas may contain up to 30% crystalline silica.

The particle size of the refractory silica can vary from 1 to 100 microns. For the most preferred embodiment, in which vitreous and crystalline silica are used, the particle sizes of vitreous silica ranges from 40 to 60 microns and that of the crystalline silica ranges from 1 to 20 microns.

In order to achieve low viscosity in a refractory slurry composition of this invention, the three suspending agents are first dissolved in water with the aid of low shear mixing. Low shear mixing can be accomplished by a propeller type mixer capable of about 500 r.p.m. or less. It has been found that, by having the carboxymethyl cellulose and carboxyvinyl polymers present at the concentrations specified hereinabove, high shear mixing is not necessary to obtain adequate dispersion. By high shear mixing, it is to be understood that mixing of the order of about 1,000–4,000 r.p.m. is meant. Such mixing can be accomplished with any suitable apparatus, such as a centrifugal pump.

It is important for achieving a refractory slurry composition having low viscosity within the range of about 800–1,500 cps that mixing be done in accordance with the steps outlined above or hereinbelow. Low shear mixing of the suspending agents avoids complete dispersion of the clay platelets and the organic polymer particles, thereby rendering a solution having lower viscosity than it would have if high shear mixing were employed.

If necessary, the pH of the solution of suspending agents in water is adjusted to within the range of 5 to 9 by the addition of a dilute caustic solution. Almost any base, such as sodium hydroxide, potassium hydroxide, magnesium hydroxide or ammonium hydroxide is suitable for this purpose. It is preferred to add a dilute solution of sodium hydroxide to bring the pH within a preferred pH range of 6 to 8. Other carboxyvinyl polymer preparations which do not require pH adjustment may be used in the refractory slurry composition of this invention.

After the suspending agents are dissolved in water and the pH of the resulting solution is adjusted to within the desired range, the other above mentioned ingredients with the exception of the refractory silica may be added in any order to obtain the binder vehicle concentrate. It is preferred to add the antifoam agent and the formaldehyde next. When all the components of the binder vehicle concentrate have been added, the mixture is blended with low shear mixing followed by moderate to high shear mixing to render the solution uniform.

The binder vehicle concentrate is diluted with approximately an equal part by weight of water and approximately an equal part by weight of refractory silica is added thereto while using low to moderate shear mixing to accomplish dispersion. As an alternative to mixing the binder vehicle concentrate, water and refractory silica at the site of manufacturing, the binder vehicle concentrate can be shipped to the place of use where dilution by water and addition of the refractory silica can be accomplished, thereby reducing shipping cost.

When the binder vehicle concentrate, water and refractory silica are mixed according to the steps outlined above, a refractory slurry composition of low viscosity within the range of 800 to 1,500 cps. is obtained. The viscosity of the refractory slurry controls the type of pumping equipment needed at the site where the slurry is to be used. A low viscosity allows the use of a standard air operated diaphragm pump whereas high viscosity slurries require special high pressure pumps. In addition, for a lower viscosity slurry one may use a longer hose on the pump and obtain the same pressure at the spray nozzle of the hose that would be achieved with a shorter hose when a higher viscosity slurry is utilized. Thus, a greater flexibility in the use of the slurry is achieved by having a low viscosity.

When low viscosity is not a primary objective high shear mixing can be utilized in the process steps outlined hereinabove to obtain a stable refractory slurry having a viscosity within the conventional range of about 2,500 to 3,500 cps.

The compositions of the present invention can be applied to metal surfaces in a variety of ways among which are brushing, coating, dipping, and spraying. These compositions are most advantageously applied by spraying them onto the metal surfaces while said surfaces are hot, i.e., over 200°F., since the volatile liquids contained in the slurry are thereby easily driven off.

A better understanding of the invention will be gained from the following examples:

EXAMPLE 1

A binder vehicle concentrate having the following composition by weight is prepared in the manner given below:

| Component | Weight Percent |
| --- | --- |
| "Ludox" HS-40 colloidal silica sol (40% SiO$_2$ solids having a particle size of 13-14 millimicrons) | 60.00 |
| Water | 30.81 |
| Magnesium montmorillonite clay "Benaqua" | 0.50 |
| "Carbopol 941", carboxyvinyl polymer | 0.24 |
| "CMC-7H", carboxymethyl cellulose | 0.24 |
| Sodium hydroxide | 0.10 |
| Ethylene glycol | 8.0 |
| Formaldehyde | 0.05 |
| "SAG-530", wetting agent solution | 0.04 |
| "AF-60", silicone-based antifoam dispersion | 0.02 |

The suspending agents are dissolved in the water with low shear mixing obtained by using a propeller-type mixer of about 500 r.p.m. shaft speed for about 30 minutes. While mixing is continued, a 10 percent by weight sodium hydroxide solution is added to the solution of suspending agents to adjust the pH of this solution to within the range of about 5 to 9. The other binder vehicle concentrate ingredients are added with low shear mixing and the solution is sheared to uniformity with high shear mixing from a centrifugal pump operated at shaft speeds of from 1,000 to 4,000 r.p.m. for 15 to 60 minutes.

After the concentrate is diluted with an equal weight of water, the refractory slurry is made by the addition of silica flours thereto in such amount as to constitute about 34 weight percent of the final refractory slurry. The silica flour which contains particles having a size of less than 44 microns is about 50 percent by weight "vitreous silica" (Tennessee Electro Minerals), which is itself about 70–85 weight percent vitreous and the balance is crystalline, and about 50 percent by weight "amorphous" silica (Illinois Mineals, Grade 54). This latter silica is essentially crystalline.

Following the addition of the silica flour, the refractory slurry is rendered uniform by mixing the slurry with a propeller agitator operated at 450 r.p.m. shaft speed for 120 minutes. The resulting refractory slurry, which is about 33 percent by weight added water, 33 percent by weight binder vehicle concentrate and 34 percent by weight silica flours, has a viscosity of about 800–1,200 c.p.s. when measured with a Brookfield viscometer at about 68°–72°F., cylindrical spindle 2 at 6 r.p.m. It is stable against significant viscosity changes, sedimentation, or liquid separation for at least 6 months under static conditions at temperatures up to 140°F. The slurry is not permanently damaged on freezing, but some reblending is usually required as a result of the "water extraction effect" of growing ice crystals.

The slurry is applied to hot (200°–600°F.) metal surfaces, preferably by spraying. The applied layer of slurry dries to a hard, dense, adherent, refractory coating which is substantially smooth, continuous, and crust-free.

The resultant refractory coating may be used in a number of important industrial applications such as, protecting the base and walls of molds against the erosive effects of poured molten metals and protecting against "welding" of solidifying metals to the containing surfaces upon cooling.

EXAMPLE 2

A stable refractory slurry having the composition of

Example 1 and a viscosity around 2,600–3,400 c.p.s. as measured with a Brookfield viscometer, cylindrical spindle 3 at 6 r.p.m., is prepared by making the diluted binder vehicle concentrate (hereinafter called the binder vehicle) in accordance with the method given hereinbelow.

The "Benaqua" clay suspending agent is dispersed in water with high shear mixing from a centrifugal pump operated at shaft speeds of from about 1,000 to 4,000 r.p.m. for 15 to 60 minutes. Thereafter the "Carbopol" and "CMC" are added and dispersed with low shear mixing for about 30 minutes. After the pH of the resulting solution is adjusted to within the range of 5–9 by the addition of a 10 weight percent sodium hydroxide solution, the remaining vehicle ingredients are added to the binder vehicle solution, which is then stirred for about 1 hour. The silica flours are added as in Example 1 to make the refractory slurry.

The use conditions and coating characteristics of the slurry are similar to those of Example 1 except that higher pumping pressures are required to deliver the same amount of slurry with the same equipment. The higher viscosity thereby serves as a "flow control" means where more flow than desired is obtained with the thinner slurry of Example 1.

EXAMPLE 3

A refractory slurry composition similar to that of Example 2 is prepared as described therein with the exception that the colloidal silica solids content based upon the weight of the slurry is increased from 8.15 to 13.6 weight percent. The dried refractory coating obtained with this slurry possesses greater surface hardness, coating density and adherence than a coating from the slurry of Example 2.

EXAMPLE 4

A slurry is prepared in the same manner and with the same composition as described in Example 2, but the ethylene glycol content is increased from 2.67 to 13.3 weight percent based on the refractory slurry. This additional ethylene glycol depresses the freezing point of the refractory slurry sufficiently that freezing rarely occurs in commercial use. When some freezing does occur, the slurry is of a slushy consistency that can still be applied to hot metal surfaces without requiring thawing.

The invention claimed is:

1. A suspending agent system useful for suspending refractory grains comprising (a) carboxymethyl cellulose and (b) a water-soluble carboxyvinyl polymer having a molecular weight within the range of about 250,000 to 4,000,000 in a total amount of about 36 to 65 weight percent with the relative amount of (a) to (b) varying from a weight percent ratio of about 1:4 to 4:1 and (c) magnesium montmorillonite clay in a concentration of about 35 to 64 weight percent.

2. A binder vehicle concentrate for a silicious refractory slurry composition useful for coating heat sensitive surfaces comprising from about 20 to 32 percent by weight colloidal silica; a three component suspending agent system comprising (a) carboxymethyl cellulose and (b) a water-soluble carboxyvinyl polymer having a molecular weight within the range of about 250,000 to 4,000,000 in a total amount of about 0.45 to 0.55 percent by weight with the relative amount of (a) to (b) varying in a weight percent ratio of about 1:4 to 4:1 and (c) magnesium montmorillonite from 0.30 to 0.80 percent by weight; 0 to 0.20 percent by weight of a base selected from the group consisting of sodium hydroxide, potassium hydroxide and ammonium hydroxide; and the remainder being water; said weight percentages being based upon the total weight of the binder vehicle concentrate.

3. A stable, silicious, refractory slurry composition useful for coating heat sensitive surfaces comprising refractory silica dispersed in a colloidal silica binder vehicle concentrate and water, the ratio of the refractory silica to said binder vehicle concentrate to water being about 1:1:1 on a weight basis; said binder vehicle concentrate containing about 20 to 32 percent by weight colloidal silica; a three component suspending agent system comprising (a) carboxymethyl cellulose and (b) a water-soluble carboxyvinyl polymer having a molecular weight within the range of about 250,000 to 4,000,000 in a total amount of about 0.45 to 0.55 percent by weight with the relative amount of (a) to (b) varying in a weight percent ratio of about 1:4 to 4:1 and (c) about 0.30 to 0.80 weight percent of magnesium montmorillonite clay; 0 to 0.20 percent by weight of a base selected from the group consisting of sodium hydroxide, potassium hydroxide and ammonium hydroxide; and the remainder being water, wherein for all components of the binder vehicle concentrate said weight percentages are based upon the total weight of the binder vehicle concentrate.

4. A composition of claim 3 having as an additional component a water soluble polyhydric aliphatic compound compatible with the colloidal silica present in amounts from about 6 to 40 weight percent based upon the total weight of the binder vehicle concentrate.

5. A composition of claim 4 wherein the polyhydric aliphatic compound is ethylene glycol.

6. A refractory slurry composition of claim 3 wherein the refractory silica consists of 30 to 50 weight percent vitreous silica and from 50 to 70 percent by weight crystalline silica.

7. A stable silicious, refractory slurry composition of claim 6 wherein the binder vehicle concentrate is comprised of about 0.2 to 0.3 weight percent of carboxymethyl cellulose, about 0.3 to 0.2 weight percent of a water-soluble carboxyvinyl polymer having a molecular weight within the range of about 250,000 to 4,000,000, about 0.4 to 0.6 weight percent of magnesium montmorillonite clay, about 50 to 70 weight percent of a colloidal silica sol having 40 percent by weight colloidal silica, about 0.08 to 0.12 weight percent of sodium hydroxide, about 6 to 10 weight percent of ethylene glycol, about 0.02 to 0.05 weight percent of nonionic or anionic wetting agent, about 0.01 to 0.03 weight percent of an antifoam agent, and about 0.03 to 0.07 weight percent of formaldehyde; the remainder being water.

8. A stable, silicious, refractory slurry composition of claim 3 having a low viscosity within the range of 800–1,500 cps.

9. A process of making a composition of claim 8 comprising the following steps:
 1. Using low shear mixing to dissolve the suspending agents in water;
 2. Adding the base as a dilute solution in sufficient amount to bring the pH of the solution of suspending agents to between 5 to 9;
 3. Adding colloidal silica sol and using moderate to high shear mixing to render the solution uniform; and
 4. Diluting with water, adding refractory silica and using low to moderate shear mixing to accomplish dispersion.

* * * * *